US009856085B1

(12) United States Patent
Workman

(10) Patent No.: US 9,856,085 B1
(45) Date of Patent: Jan. 2, 2018

(54) HOPPER FOR CEMENT CHUTE

(71) Applicant: Deslauriers, Inc., LaGrange Park, IL (US)

(72) Inventor: Gary Workman, Las Vegas, NV (US)

(73) Assignee: Deslauriers, Inc., LaGrange Park, IL (US)

( * ) Notice: Subject to any disclaimer, the term of this patent is extended or adjusted under 35 U.S.C. 154(b) by 0 days.

(21) Appl. No.: 15/210,451

(22) Filed: Jul. 14, 2016

(51) Int. Cl.
B65G 11/00 (2006.01)
B65G 11/18 (2006.01)
B65G 11/02 (2006.01)

(52) U.S. Cl.
CPC .......... B65G 11/186 (2013.01); B65G 11/026 (2013.01); *B65G 2201/04* (2013.01)

(58) Field of Classification Search
CPC ........ B65G 11/00; B65G 11/166; B65G 11/10
USPC ................................. 193/2 R, 4, 5, 25 R, 10
See application file for complete search history.

(56) References Cited

U.S. PATENT DOCUMENTS

| | | | | |
|---|---|---|---|---|
| 1,220,249 A * | 3/1917 | McWhorter | ........... | B65D 25/48 198/569 |
| 2,764,450 A * | 9/1956 | Rosener | ................. | B60P 1/283 193/5 |
| 3,746,140 A * | 7/1973 | Schiffelbein | .......... | B28C 5/4248 193/10 |
| 5,531,518 A * | 7/1996 | Alves | .................... | B28C 5/4248 193/10 |
| 6,782,925 B2 * | 8/2004 | Raposo | ................... | B03B 9/063 141/11 |
| 6,971,495 B2 * | 12/2005 | Hedrick | ................. | B65D 88/28 193/2 R |
| 7,178,657 B1 * | 2/2007 | Hafen | ................... | B28C 5/0818 193/10 |
| 8,336,585 B2 * | 12/2012 | Royce | ................... | B28C 5/4244 193/4 |
| 8,522,948 B1 * | 9/2013 | Galvin, IV | .......... | B65G 11/026 193/10 |
| 9,701,041 B2 * | 7/2017 | McFarlane | ............ | B28C 5/4248 |
| 2008/0175092 A1 * | 7/2008 | Manno | .................... | B03B 9/063 366/68 |
| 2009/0229706 A1 * | 9/2009 | Royce | ................... | E04G 21/025 141/331 |

* cited by examiner

*Primary Examiner* — James R Bidwell
(74) *Attorney, Agent, or Firm* — Wood, Phillips, Katz, Clark & Mortimer

(57) ABSTRACT

A concrete accessory for use with a ready mix chute comprises a funnel shaped hopper. The hopper has a wide upper opening of a size corresponding to that of a ready mix chute and tapering to a narrow lower opening. The hopper has a seamless inner surface and a pair of hollow aligned receptacles on opposite sides of the hopper and extending outwardly therefrom proximate the upper opening. An elongate rod has a length greater than the spacing between the aligned hollow receptacles to be received therein. A hanger assembly removably attaches the rod to a ready mix chute, in use, to support the hopper below the chute.

18 Claims, 3 Drawing Sheets

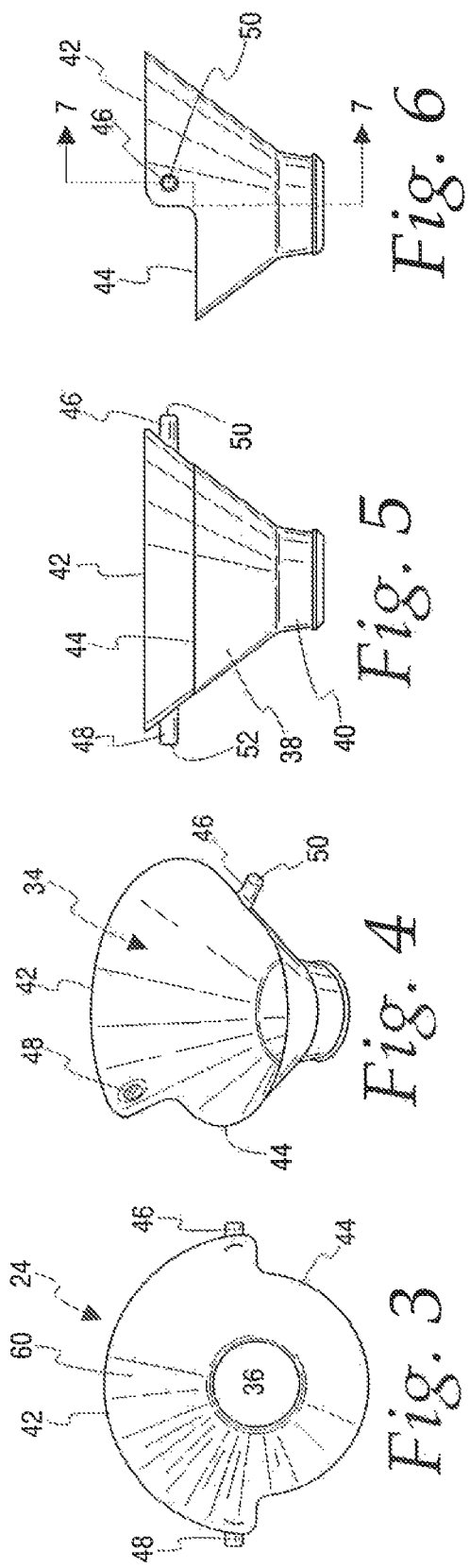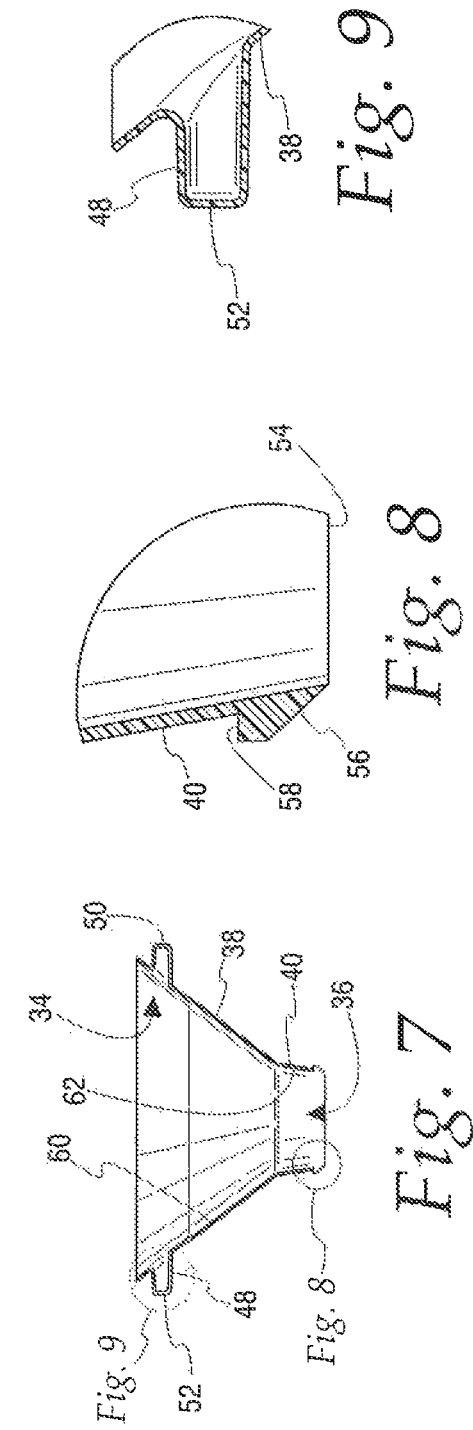

HOPPER FOR CEMENT CHUTE

FIELD OF THE INVENTION

The application relates to a concrete accessory, and, more particularly, to a hopper used with a ready mix chute.

BACKGROUND

Ready mix concrete is concrete prepared at a central location, rather than at a job site. The concrete is delivered to the job site in a ready mix concrete truck. A ready mix concrete truck includes a rotational mixer that stores the concrete and pours the concrete using a chute. Such a chute is commonly referred to as a ready mix chute.

At some job sites it is necessary to more precisely control the distribution of the concrete. It may be difficult to accurately position the ready mix chute. One known concrete accessory is a hopper which attaches to the end of the ready mix chute to distribute concrete easily and accurately. Such a hopper includes a plastic cone having a wide opening at a top and a narrower opening at a bottom. The cone is formed of a flat piece of plastic rolled into a cone with opposite ends bolted together to maintain the conical shape. An elongate sleeve, known as an elephant trunk, is conventionally bolted around the bottom opening to control the delivery of the concrete.

This known hopper is functional, but costly to manufacture. Extensive labor is required to assemble such a device as the two ends of the material pattern are bent to meet and then are fastened together with hardware at the seam. This design also requires labor and hardware to connect a pipe and chain to the hopper so that it may in turn be connected to the ready mix chute. Finally, this version requires a labor intensive process that uses expensive hardware to connect the elephant trunk to the bottom of the hopper. Also, the seam in the hopper and the fastening hardware provide surfaces on which concrete or grout-like material may become embedded and make it more difficult to clean the hopper.

The present application is directed to improvements in concrete accessories.

SUMMARY

As described herein, a concrete accessory comprises a hopper having a seamless inner surface formed of one piece plastic construction.

As is disclosed herein, in accordance with one aspect, a concrete accessory for use with a ready mix chute comprises a funnel shaped hopper. The hopper has a wide upper opening of a size corresponding to that of a ready mix chute and tapering to a narrow lower opening. The hopper has a seamless inner surface and a pair of hollow aligned receptacles on opposite sides of the hopper and extending outwardly therefrom proximate the upper opening. An elongate rod has a length greater than the spacing between the aligned hollow receptacles to be received therein. A hanger assembly removably attaches the rod to a ready mix chute, in use, to support the hopper below the chute.

It is a feature that the hopper is a one piece plastic construction.

It is another feature that the hollow receptacles are closed at distal ends.

It is further feature that the hollow receptacles are cylindrical.

It is another feature that the funnel shaped hopper has an upper frustoconical portion continuing to a lower exhaust throat.

It is yet another feature that the lower exhaust throat has a diameter of about six inches. The lower exhaust throat may have an outwardly extending peripheral ridge at its lower edge. In another aspect the concrete accessory comprises an elongate sleeve received on the throat. A clamp may be provided for securing the elongate sleeve on the throat above the ridge.

It is still another feature that the hopper has a stepped down upper edge on one side of the receptacles to be received under an end of the ready mix chute, in use.

There is disclosed in accordance with another aspect a concrete accessory for use with a ready mix chute comprising a hopper of one piece molded plastic construction. The hopper comprises a generally frustoconical upper wall connected to a generally cylindrical lower throat wall and including a wide upper opening and the throat wall tapering to a narrow lower opening. The hopper has a seamless inner surface and a pair of aligned hollow receptacles on opposite sides of the frustoconical upper wall and extending outwardly therefrom proximate the upper opening. The elongate rod has a length greater than spacing between the aligned hollow receptacles to be received therein. A hanger assembly is provided for removably attaching the rod to a ready mix chute, in use, to support the hopper below the chute.

It is a feature that the hanger assembly comprises a pair of chains each having hooks at opposite ends thereof.

Further features and advantages will be readily apparent from the specification and from the drawings.

BRIEF DESCRIPTION OF THE DRAWINGS

FIG. 3 is a plan view of a hopper of the concrete accessory of FIG. 2;

FIG. 4 is a perspective view of the hopper of FIG. 3;

FIG. 5 is a rear elevation view of the hopper of FIG. 3;

FIG. 6 is a side elevation view of the hopper of FIG. 3;

FIG. 7 is a sectional view taken along the line 7-7 of FIG. 6;

FIG. 8 is a detail view taken from FIG. 7; and

FIG. 9 is a detail view taken from FIG. 7.

DETAILED DESCRIPTION

Figure 1:
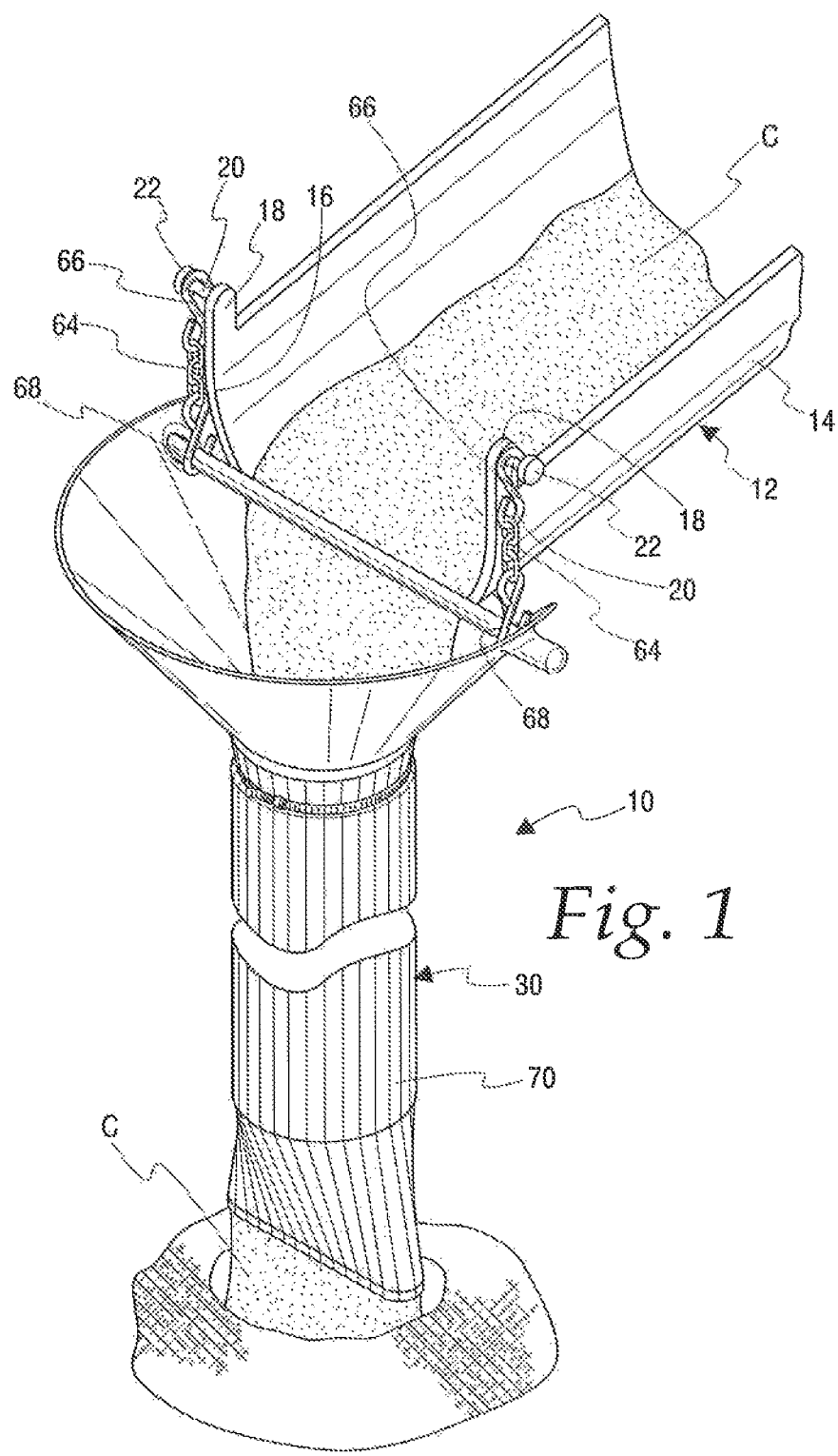
FIG. 1 is a perspective view illustrating a concrete accessory in accordance with the invention, in use, mounted to a ready mix chute.

Referring initially to FIG. 1, a concrete accessory 10 is illustrated for use with a ready mix chute 12. As is apparent, the ready mix chute is a component of a ready mix concrete truck (not shown) and includes an elongate trough 14 angled downwardly to receive concrete C which is distributed at a chute end 16. The trough 14 has a generally U-shaped cross section. A body 18 extends upwardly from the top of the trough 14 at the front end 16, at each side. A shaft 20 extends outwardly from each body 18 terminating in an enlarged head 22. The shafts 20 are conventionally used for supporting additional lengths of chute or other concrete accessories, as is known.

Figure 2:
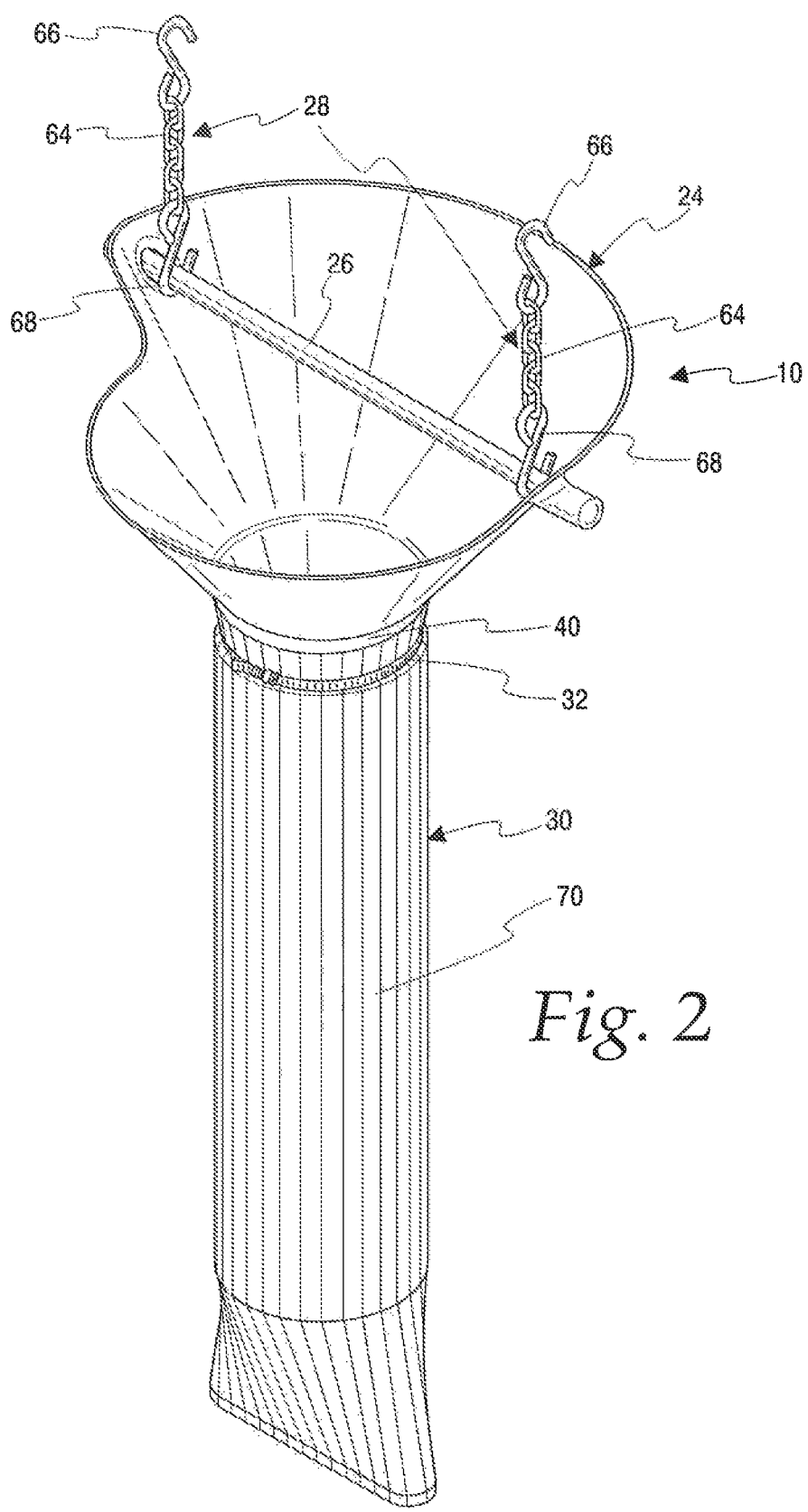
FIG. 2 is a perspective view of the concrete accessory of FIG. 1.

Referring also the FIG. 2, the concrete accessory 10 comprises a hopper 24, an elongate rod 26, a hanger assembly 28, an elephant trunk 30, and a clamp 32.

Referring to FIGS. 3-9, the hopper 24 is funnel shaped with a wide upper opening 34 of a size corresponding to the ready mix chute 12 and tapering to a narrow lower opening 36. Particularly, the hopper comprises a generally frustoconical upper wall 38 connected to a generally cylindrical lower throat wall 40. The frustoconical wall 38 has a diameter of about 22-23 inches at the upper opening 34 and a diameter of about 6-7 inches at its lower end where it connects to the throat wall 40. The throat wall 40 is generally cylindrical but is slightly tapered and is about six inches diameter at the bottom opening 36. The frustoconical wall 38 has an upper edge 42 surrounding the upper opening 34. The upper edge 42 is stepped down at 44 to be received under the ready mix chute 12, as shown in FIG. 1.

A pair of aligned, hollow cylindrical receptacles 46 and 48 are on opposite sides of the frustoconical upper wall 38 frontwardly of the stepped down edge 44. The receptacles 46 and 48 are closed by end walls 50 and 52, respectively, but open into the interior of the frustoconical upper wall 38.

The throat wall 40 ends at a lower edge 54 surrounding the bottom opening 36. The throat wall 40 includes a peripheral ridge 56 extending outwardly therefrom at the lower edge 54. The peripheral ridge 56 has an upper shoulder 58 and tapers downwardly to the lower edge 54.

The hopper 24 is unitarily molded of one piece of plastic construction. Particularly, the hopper 24 is manufactured using a rotational molding process which results in a seamless construction. The hopper 24 may be formed using High Density Polyethylene, or comparable material. The inner surface 60 of the frustoconical wall 38 and the inner surface 62 of the throat wall 40 are seamless and have a smooth transition therebetween. The benefit of having the hopper 24 with no seams is the material flow will be smoother and this construction will help minimize the chances of clogging or bridging of material. Also, without seams, the hopper 24 is be easier to clean since the concrete will not have spaces or seams in which to embed.

The rod 26 may comprise, for example, a pipe. The rod 26 is approximately twenty-four inches long. Particularly, the rod 26 has a length greater than spacing between the receptacles 48 and 50 where they merge into the frustoconical wall 38 and just less than the distance between the receptacle distal ends 50 and 52. When installing the rod 26 to the hopper 24, no hardware is required. Instead, one end of the rod 26 is inserted into one of the receptacles 48 or 50. By pinching the hopper 24 slightly so that it temporarily deforms the other end of the rod 26 can be inserted into the other receptacle 50 or 48. This eliminates requirements of additional hardware and reduces labor costs.

The hanger assembly 28 includes a pair of chains 64 each having end hooks 66 and 68. The lower hooks 68 receive the rod 26, as shown in FIG. 2. The upper hooks 66 are hung over the shafts 20 of the chute 14, as shown in FIG. 1.

The elephant trunk 30 comprises an elongate sleeve 70 having a diameter of about six inches. The elephant trunk 30 may be formed of a heavy duty vinyl, or the like. The elephant trunk 30 can be any desired length and is available in fifty foot rolls that can be cut to length, as is known. The sleeve 70 is places over the throat wall 40 so that it extends above the peripheral ridge 56. The clamp 38, which may be a conventional pipe clamp, is tightened around the sleeve 70 just above the peripheral ridge shoulder 58 to secure the elephant trunk 30 to the hopper 24. This allows the user to control the dispensing of the concrete C out of the lower end of the elephant trunk, as shown in FIG. 1. Particularly, the elephant trunk 30 can be moved around as necessary, without necessity of moving the chute 12, as will be apparent.

Thus, as described, the concrete accessory 10 saves costs, eliminates hardware, reduces assembly labor, and is easier to both use and maintain.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a single embodiment has been described in detail above, other modifications are possible. Other embodiments may be within the scope of the following claims.

The foregoing disclosure of specific embodiments is intended to be illustrative of the broad concepts comprehended by the invention.

The invention claimed is:

1. A concrete accessory for use with a ready mix chute comprising:
   a funnel shaped hopper with a wide upper opening of a size corresponding to a ready mix chute and tapering to a narrow lower opening, the hopper having a seamless inner surface and a pair of aligned hollow receptacles on opposite sides of the hopper and extending outwardly therefrom proximate the upper opening, wherein the hollow receptacles are closed at distal ends;
   an elongate rod having a length greater than spacing between the aligned hollow receptacles to be received therein; and
   a hanger assembly for removably attaching the rod to a ready mix chute, in use, to support the hopper below the chute.

2. The concrete accessory of claim 1 wherein the hopper is of one piece plastic construction.

3. The concrete accessory of claim 1 wherein the hollow receptacles are cylindrical.

4. The concrete accessory of claim 1 wherein the lower exhaust throat has a diameter of about eight inches.

5. The concrete accessory of claim 1 wherein the hopper has a stepped down upper edge on one side of the receptacles to be received under an end of the ready mix chute, in use.

6. The concrete accessory of claim 1 wherein the funnel shaped hopper has an upper frustoconical portion continuing to a lower exhaust throat.

7. The concrete accessory of claim 6 wherein the lower exhaust throat has an outwardly extending peripheral ridge at its lower edge.

8. The concrete accessory of claim 7 further comprising an elongate sleeve received on the throat.

9. The concrete accessory of claim 8 further comprising a clamp for securing the elongate sleeve on the throat above the ridge.

10. A concrete accessory for use with a ready mix chute comprising:
    a hopper of one piece molded plastic construction, the hopper comprising a generally frustoconical upper wall connected to a generally cylindrical lower throat wall and including a wide upper opening and the throat wall tapering to a narrow lower opening, the hopper having a seamless inner surface and a pair of aligned hollow receptacles on opposite sides of the frustoconical upper wall and extending outwardly therefrom proximate the upper opening;

an elongate rod having a length greater than spacing between the aligned hollow receptacles to be received therein; and a hanger assembly for removably attaching the rod to a ready mix chute, in use, to support the hopper below the chute, wherein the hanger assembly comprises a pair of chains each having hooks at opposite ends thereof.

11. A concrete accessory for use with a ready mix chute comprising:

a hopper of one piece molded plastic construction, the hopper comprising a generally frustoconical upper wall connected to a generally cylindrical lower throat wall and including a wide upper opening and the throat wall tapering to a narrow lower opening, the hopper having a seamless inner surface and a pair of aligned hollow receptacles on opposite sides of the frustoconical upper wall and extending outwardly therefrom proximate the upper opening, wherein the hollow receptacles are closed at distal ends;

an elongate rod having a length greater than spacing between the aligned hollow receptacles to be received therein; and a hanger assembly for removably attaching the rod to a ready mix chute, in use, to support the hopper below the chute.

12. The concrete accessory of claim 11 wherein the hollow receptacles are cylindrical.

13. The concrete accessory of claim 11 wherein spacing between the hollow receptacles is about twenty inches.

14. The concrete accessory of claim 11 wherein the lower throat wall has a diameter of about eight inches.

15. The concrete accessory of claim 11 wherein the lower throat wall has an outwardly extending peripheral ridge at its lower edge.

16. The concrete accessory of claim 15 further comprising an elongate sleeve received on the throat wall.

17. The concrete accessory of claim 16 further comprising a clamp for securing the elongate sleeve on the throat wall above the ridge.

18. The concrete accessory of claim 11 wherein the hopper has a stepped down upper edge on one side of the receptacles to be received under an end of the ready mix chute, in use.

\* \* \* \* \*